United States Patent [19]

Hoffman et al.

[11] 4,055,632
[45] Oct. 25, 1977

[54] CONTROLLABLE GAS GENERATOR

[75] Inventors: Robert T. Hoffman; Roger W. Buecher, both of Kailua, Hawaii

[73] Assignee: The United States of America as represented by the Secretary of the Navy, Washington, D.C.

[21] Appl. No.: 753,026

[22] Filed: Dec. 22, 1976

[51] Int. Cl.² .......................... C01B 1/05; B01J 7/02
[52] U.S. Cl. .................................. 423/657; 23/282; 423/659
[58] Field of Search ............... 423/657, 648, 579, 437, 423/438, 659; 23/281, 282

[56] References Cited

U.S. PATENT DOCUMENTS

| | | | |
|---|---|---|---|
| 3,174,833 | 3/1965 | Blackmer | 23/282 |
| 3,346,506 | 10/1967 | Beumel | 423/657 X |
| 3,453,086 | 7/1969 | Harm | 23/282 |
| 3,458,288 | 7/1969 | Lafyatis et al. | 23/282 |
| 3,459,493 | 8/1969 | Ross | 423/657 X |
| 3,540,485 | 11/1970 | Kummins | 423/657 X |
| 3,787,186 | 1/1974 | Geres | 423/657 X |

Primary Examiner—Edward J. Meros
Attorney, Agent, or Firm—Richard S. Sciascia; Ervin F. Johnston

[57] ABSTRACT

The present invention is a controllable gas generator which includes an elongated container having a top and a bottom. Two different liquids and pellets are utilized, the pellets being nonreactive with and floatable in a first one of the liquids and reactive with and nonfloatable in a second one of the liquids. The first and second liquids are disposed in the container, the first liquid being denser than the second liquid so that the first and second liquids form an interface. A partition is mounted in the container below the level of the interface for dividing the container into top and bottom compartments. The pellets are disposed in the bottom compartment with the first liquid, and a valve is mounted in the partition for dispensing the pellets. With this arrangement, an opening of the valve will allow pellets to exit therethrough and ascend in the first liquid to the interface where the pellets will react with the second fluid to generate gas.

6 Claims, 3 Drawing Figures

CONTROLLABLE GAS GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Variable buoyancy systems are commonly employed in salvaging objects from the ocean or positioning and recovering oceanographic instrumentation. These buoyancy systems may take several different forms, such as lift bags or ballast tanks. Historically, high pressure air tanks have been utilized for deballasting such buoyancy systems. More recently various substances have been reacted to generate a gas for deballasting the systems. Hydrazine is commonly reacted to generate a gas, and has been found highly satisfactory for raising large objects from the ocean bottom. However, hydrazine is not cost effective when smaller objects are to be salvaged. Gas generated by reacting metallic hydrides is considerably more cost effective in raising smaller objects, however, prior art gas generators using metallic hydrides could not be controlled sufficiently to perform their intended job function. The specific problem with prior art gas generators utilizing metallic hydrides is in the starting and the stopping of the reaction.

SUMMARY OF THE INVENTION

The present invention provides a gas generator which can be easily controlled in the starting and stopping of the reaction of a metallic hydride. The present gas generator includes an elongated container which has a top and a bottom. First and second liquids and pellets are utilized, the pellets being nonreactive with and floatable in the first liquid and reactive with and nonfloatable in the second liquid. The first and second liquids are disposed in the container, and the first liquid is denser than the second liquid so the first and second liquids form an interface. A partition is mounted in the container below the level of the interface for dividing the container into top and bottom compartments. The pellets are disposed in the bottom compartment with the first liquid, and a valve is mounted in the partition for dispensing the pellets. With this arrangement, an opening of the valve means will dispense the pellets so that they will ascend in the first liquid to the interface where the pellets will react with the second fluid to generate the gas.

STATEMENT OF THE OBJECTS OF THE INVENTION

An object of the present invention is to overcome the aforementioned problems associated with prior art gas generators.

Another object is to provide a gas generator which can be easily controlled in the starting and stopping of a reaction for generating gas.

A further object is to provide a gas generator which can be easily controlled in the starting and stopping of a reaction of a metallic hydride for the generation of a gas.

Still another object is to provide a simple and very inexpensive gas generator which can be easily controlled.

Still a further object is to provide a method of generating gas which will efficiently control the starting and stopping of a reaction of substances for the generation of such gas.

Yet another object is to provide a method of generating gas utilizing the reaction of a metallic hydride with water with the starting and stopping of such reaction easily and efficiently controlled.

These and other objects of the invention will become more readily apparent from the ensuing description when taken together with the drawings.

DESCRIPTION OF THE PREFERRED EMBODIMENT

Figure 2:
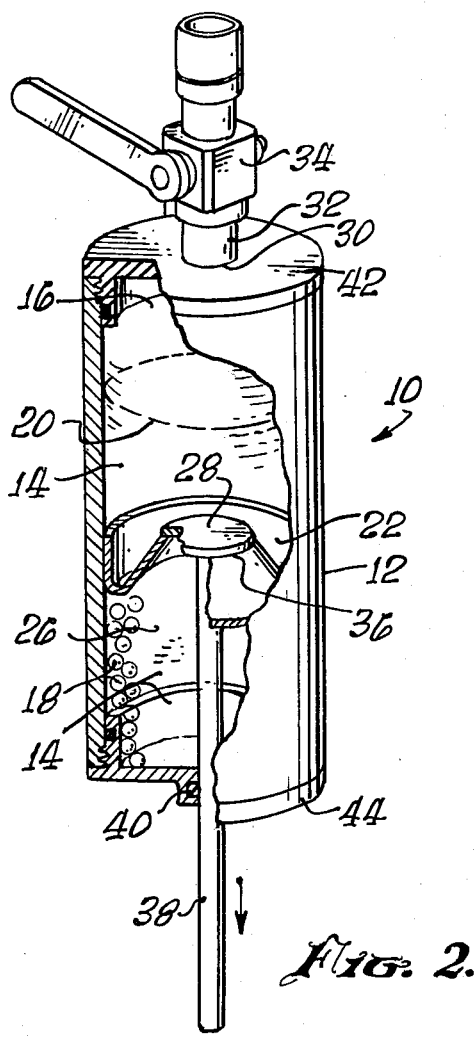
FIG. 2 is an isometric illustration of the present invention in an off mode generation of gas.

Referring now to the drawing, wherein like reference numerals designate like or similar parts throughout the several views, there is illustrated in FIG. 2 a gas generator 10 which includes an elongated container 12 having a top and a bottom. First and second liquids, 14 and 16, respectively, and pellets 18 are provided. The pellets 18 are nonreactive with and floatable in the first liquid 14 and reactive with and nonfloatable in the second liquid 16.

The first and second liquids 14 and 16 are disposed in the container, and the first liquid 14 is more dense than the second liquid 16 so that the first and second liquids form an interface 20. A partition 22 is mounted in the container 12 below the level of the interface 20 for dividing the container 12 into top and bottom compartments 24 and 26, respectively.

The pellets 18 are disposed in the bottom compartment 26 with the first liquid 14 and a valve means 28 is mounted in the partition 22 for dispensing the pellets. With this arrangement, the opening of the valve means 20 will dispense pellets so that they will ascend upwardly in the first liquid 14 to the interface 20 where the pellets will react with the second fluid to generate gas. This gas may be dispensed through the top of the container through an opening 30. A conduit 32 may be threaded in the opening 30 and may have a ball valve 34 for opening and closing off the passage of the gas.

Figure 3:
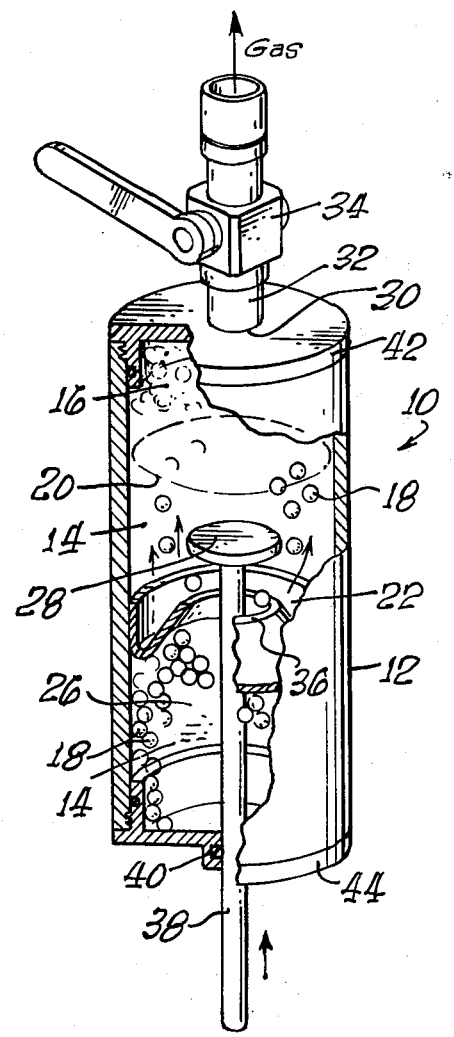
FIG. 3 is an isometric illustration of the invention in an on mode with regard to the generation of gas.

The valve means 28 may include the partition 22 being provided with an aperture or valve seat 36. This valve seat 36 may be the upper end of a frustoconical center portion of the partition 22. The valve means 28 may further include a valve, which is similar to an automobile engine valve, for seating with the valve seat 36 to close off the partition, as illustrated in FIG. 2, and for opening the partition when displaced thereabove, as illustrated in FIG. 3. A stem or push rod 38 may be connected to the bottom of valve 28 and may extend sealably, via an o-ring 40, through and out from the bottom of the container 12. The extension of the stem 38 from the bottom of the container may then be reciprocated to open and close the valve with the valve seat 36. The container 12 is preferably cylindrical, and is provided with top and bottom threaded caps, 42 and 44 respectively, for easy assembly and filling of the container.

The pellets 18 are a metallic hydride plus a catalyst. In the preferred embodiment the pellets 18 are sodium borohydride and cobalt chloride. It has been found that a seven percent cobalt chloride is a satisfactory catalyst additive, however this percentage can be varied depending on the reaction rate desired. These pellets can be procured under the trade name of "Hypripill" which has a specific gravity of about 1.1. The first liquid 14 is pure freon which inert in respect to the pellets 18, and which has a specific gravity of about 1.55. This means that the pellets 18 will float in the freon 14. The second liquid 16 is water which has a specific gravity less than the pellets 18. This means that the pellets 18 will float upwardly in the freon 14 until they reach the interface 20 at which time they will become stationary and react with the water 16 to produce hydrogen gas.

The method of the present invention includes providing first and second liquids, which may be freon 14 and water 16, and providing pellets 18 which may be a combination of sodium chloride and cobalt chloride. The fluids 14 and 16 are contained together so that the fluids interface, such as at 20, with the first fluid 14 being located below the second fluid 16. The pellets 18 are disposed in the first fluid 14 below the interface 20, and the pellets 18 are dispensed from the first fluid 14 so that the dispensed pellets will float upwardly to the interface 20 and react with the second fluid 16 to generate a gas. This method may encompass any desired apparatus for accomplishing the aforementioned steps of operation.

OPERATION OF THE INVENTION

Figure 1:
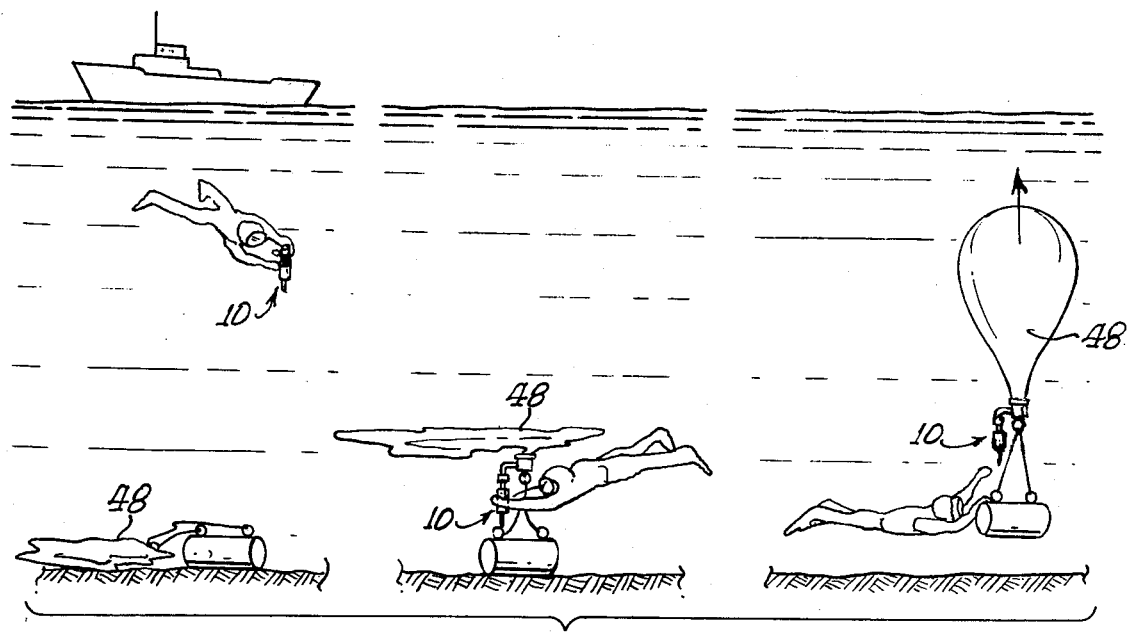
FIG. 1 is an ocean elevation view illustrating an exemplary use of the present invention for salvaging an object from the bottom of the ocean.

In the operation of the present invention the bottom cap 44 may be removed and the pellets 18 may be poured into the bottom compartment 26 with the container 12 in an upside down position. Cap 44 is then replaced, the container is turned to its upright position, as illustrated in FIGS. 2 and 3, and the top cap 42 is removed. The valve 28 is then opened, as illustrated in FIG. 3, and freon 14 is poured in until it is above the partition 22, such as at level 20. The valve 28 is then closed, as illustrated in FIG. 2, and water 16 is poured in above the freon so as to form an interface 20 therebetween. The cap 42 is then replaced on the container 12, and the generator 10 is now ready for the generation of gas. As illustrated in FIG. 1a, a diver may descend from a surface vessel with the gas generator 10 in hand toward an object 46 to be retrieved from the bottom of the ocean. As illustrated in FIG. 1b, a lift bag 48, in a deflated condition, may be connected to the object 46. The diver connects the exhaust conduit 32 of the gas generator to a fitting at the bottom of a lift bag 48, at all times holding the gas generator in an upright position. The valve 34 is then opened and the stem 38 is pushed upwardly to open the inner valve 28 so as to allow pellets to ascend upwardly in the first liquid 14 through the valve to the interface 20, as illustrated in FIG. 3. When sufficient gas has been discharged into the lift bag, as illustrated in FIG. 1c, the diver then closes the inner valve 28 by pulling downwardly on the stem 38 and closes off the outside valve 34. The diver may then disconnect the gas generator 10 from the lift bag 48 and the lift bag will then perform its function to raise the object 46 to the surface of the ocean for retrieval purposes.

Obviously, many modifications and variations of the present invention are possible in the light of the above teachings, and, it is therefore understood that the invention may be practiced otherwise than as specifically described.

What is claimed is:

1. A gas generator comprising:
   an elongated container having a top and a bottom;
   first and second liquids and pellets, the pellets being nonreactive with and floatable in the first liquid and reactive with and nonfloatable in the second liquid;
   the first and second liquids being disposed in the container, and the first liquid being denser than the second liquid so that the first and second liquids form an interface;
   a partition mounted in the container below the level of said interface for dividing the container into top and bottom compartments;
   the pellets being disposed in the bottom compartment with the first liquid;
   valve means mounted in the partition for dispensing the pellets,
   whereby upon opening the valve means pellets will exit therethrough and ascend in the first liquid to said interface where the pellets will react with the second fluid to generate the gas.

2. A gas generator as claimed in claim 1 wherein the valve means includes:
   said partition having an aperture;
   a cap located above the partition for closing the aperture;
   a stem connected to the bottom of the cap and extending sealably through and out from the bottom of the container,
   whereby the stem extending from the bottom of the container can be reciprocated to open and close the cap with respect to the aperture.

3. A gas generator as claimed in claim 1 including:
   an outlet valve means connected to the top of the container for closing off or venting generated gas.

4. A gas generator as claimed in claim 1 including:
   said first liquid being freon.

5. A gas generator as claimed in claim 4 including:
   said second liquid being water; and
   said pellets being sodium borohydride and cobalt chloride.

6. A method of generating gas comprising the steps of:
   providing liquid freon and water and sodium borohydride pellets, the pellets being nonreactive with and floatable in the freon and reactive with and nonfloatable in the water;
   containing the liquid freon and water together so that the liquids interface with the freon below the water;
   disposing the pellets in the liquid freon below said interface; and
   dispensing the pellets from the liquid freon so that the dispensed pellets will float upwardly to said interface and react with the water to generate gas.

* * * * *